US011354992B2

(12) United States Patent
Fennell et al.

(10) Patent No.: US 11,354,992 B2
(45) Date of Patent: *Jun. 7, 2022

(54) IDENTIFICATION AND EXCLUSION SYSTEM FOR RESTRICTING ACCESS TO RECREATIONAL VENUES

(71) Applicant: Preventative Enterprises Pty Ltd, Tugun (AU)

(72) Inventors: David Fennell, Tugun (AU); Justin Crosbie, Kingscliff (AU)

(73) Assignee: Preventative Enterprises Pty Ltd, Tugun (AU)

( * ) Notice: Subject to any disclaimer, the term of this patent is extended or adjusted under 35 U.S.C. 154(b) by 68 days.

This patent is subject to a terminal disclaimer.

(21) Appl. No.: 16/551,268

(22) Filed: Aug. 26, 2019

(65) Prior Publication Data

US 2019/0378388 A1    Dec. 12, 2019

Related U.S. Application Data

(63) Continuation of application No. 15/561,976, filed as application No. PCT/AU2016/050219 on Mar. 24, 2016, now Pat. No. 10,395,495.

(30) Foreign Application Priority Data

Mar. 26, 2015  (AU) ................. 2015901103

(51) Int. Cl.
*G06K 9/00*      (2022.01)
*G08B 13/196*   (2006.01)
(Continued)

(52) U.S. Cl.
CPC ..... *G08B 13/19621* (2013.01); *G06F 3/0482* (2013.01); *G06V 40/172* (2022.01);
(Continued)

(58) Field of Classification Search
CPC ........ G08B 13/19617; G08B 13/19645; G08B 13/19647; G08B 13/19652;
(Continued)

(56) References Cited

U.S. PATENT DOCUMENTS 6,314,425 B1   11/2001   Serbinis
6,785,692 B2    8/2004   Wolters, Jr
(Continued)

FOREIGN PATENT DOCUMENTS

DE          10128728 A1     1/2003

*Primary Examiner* — Huy C Ho
(74) *Attorney, Agent, or Firm* — Southern Cross Intellectual Property

(57) ABSTRACT

An identification and exclusion system and method for restricting access to recreation venues by a person who caused an incident at a recreation venue (22). The system includes a mobile communications device (12) having a camera and a GPS chip, and a computer processor (14) configured to receive an incident record (24) from the mobile communications device and broadcast over a communications network (16) the incident record to a plurality of recreation venues within a predetermined area. The incident record includes an image of the person and a record of the incident type.

12 Claims, 9 Drawing Sheets

(51) Int. Cl.
  *H04W 4/021* (2018.01)
  *G08B 25/01* (2006.01)
  *H04W 4/06* (2009.01)
  *H04M 1/72403* (2021.01)
  *G06V 40/16* (2022.01)
  *G06F 3/0482* (2013.01)
(52) U.S. Cl.
  CPC ...... *G08B 25/016* (2013.01); *H04M 1/72403* (2021.01); *H04W 4/021* (2013.01); *H04W 4/06* (2013.01)
(58) Field of Classification Search
  CPC ........ G08B 13/19663; G08B 13/19665; G08B 13/19669; G08B 21/043; G08B 25/006; G08B 25/008; G08B 25/009; G08B 25/016; G08B 25/12; G08B 26/001; G08B 26/002; G08B 26/003; G08B 26/004; G08B 26/005; G08B 26/006; G08B 26/007; G08B 26/008; G08B 27/001; G08B 27/003; G08B 27/005; G08B 27/006; G08B 27/008; G06F 3/0482; G06K 9/00288; G06K 9/00295; G06K 9/00221; H04M 1/72403; H04W 4/021; H04W 4/06
  USPC .......................................................... 382/118
  See application file for complete search history.

(56) References Cited

U.S. PATENT DOCUMENTS

| | | |
|---|---|---|
| 7,031,945 B1 | 4/2006 | Donner |
| 7,216,109 B1 | 5/2007 | Donner |
| 7,415,424 B1 | 8/2008 | Donner |
| 7,562,028 B1 | 7/2009 | Donner |
| 2002/0147982 A1 | 10/2002 | Naidoo |
| 2003/0115210 A1 | 6/2003 | Leonard |
| 2010/0149335 A1 | 6/2010 | Miller, II |
| 2011/0046920 A1 | 2/2011 | Amis |
| 2012/0313781 A1 | 12/2012 | Barker |
| 2013/0279757 A1* | 10/2013 | Kephart ............ G06K 9/00295 382/105 |
| 2014/0365574 A1* | 12/2014 | Franks ................ H04L 12/1895 709/204 |
| 2017/0092151 A1 | 3/2017 | Xi |
| 2017/0235848 A1 | 8/2017 | Van Dusen |
| 2017/0318147 A1 | 11/2017 | Merjanian |

* cited by examiner

IDENTIFICATION AND EXCLUSION SYSTEM FOR RESTRICTING ACCESS TO RECREATIONAL VENUES

FIELD OF THE INVENTION

The present disclosure relates to an identification and exclusion system for restricting access to recreation venues.

BACKGROUND OF INVENTION

A drunk or disorderly patron may be asked to leave, or be refused entry to a venue. The patron may then attempt to disguise his/her drunk or disorderly state and enter a nearby venue. Doormen at the nearby venue, not having knowledge that the patron was asked to leave at the previous venue due to his/her drunk or disorderly behaviour, may decide to admit the patron. This is a safety risk to patrons already in the venue and a risk to the staff of the venue.

SUMMARY

In one exemplary embodiment, the present disclosure is directed to an identification and exclusion system for restricting access to recreation venues by a person who caused an incident at a first recreation venue. The system includes a mobile communications device having a camera, a display, a GPS chip and a wireless communications radio. The system includes a software application executed on the mobile communications device to configure the mobile communications device to display a graphic user interface to facilitate creation of an incident record. The graphic user interface includes fields for incident type and a photo image of a person who caused an incident at a first recreation venue where the mobile communications device is located. The system includes a computer processor configured to receive an incident record from the mobile communications device. The computer processor is configured to broadcast over a communications network the incident record to a plurality of recreation venues within a predetermined area.

The predetermined area may be an area within a predetermined distance of the first recreation venue where the incident occurred. The predetermined area may be venues within a designated geographic precinct. The predetermined area may be venues along a specified street or strip.

The system may include an offender library database. The computer processor may be configured to save at least a portion of the incident record in the offender library database.

The processor may be configured to broadcast at least a portion of the incident record to a law enforcement authority located within a predetermined distance of the first recreation venue where the incident occurred.

The incident record received by the computer processor may contain only the location of the first venue, incident type, and photo image of the person who caused the incident. The incident record may exclude any name details of the person who caused the incident.

The computer processor may include image recognition technology to identify the person whose photo image appears in the incident record. The wireless communications radio may be a Wi-Fi radio.

The predetermined distance may be based on the GPS location of the mobile communications device. The predetermined distance may be based on the physical address of the first recreation venue.

The system preferably uses push notifications of a new incident record.

In another exemplary embodiment, the present disclosure is directed to a method for restricting access to recreation venues by a person who caused an incident at a first recreation venue. The method includes creating an incident record on a mobile communications device, including populating a field for incident type. The method includes taking a photo of the person using the mobile communications device to generate a photo image included in the incident record. The method includes receiving, over the communications network, an incident record from the mobile communications device. The method includes broadcastings, over the communications network, the incident record to a plurality of recreation venues within a predetermined area.

The predetermined area may be a distance of the first recreation venue where the incident occurred.

The incident record preferably does not include the name of the person who caused the incident.

The server preferably broadcasts the incident records to the communications devices as push notifications.

The photo image may be compared to a database of photos to image recognize the person whose photo image appears in the incident record.

At least a portion of the incident record may be stored in an offender library database. The at least a portion of the incident record may be deleted from the offender library database after a predetermined time.

The incident record may be broadcast to a law enforcement authority. The method may include requesting confirmation using the mobile communications device that the incident report is to be broadcast to the law enforcement authority.

In another exemplary embodiment, the present disclosure sets forth a computer program encoded on a non-transitory computer readable medium which may include instructions that when executed by the processor cause the processor to create an incident record and populate a field for an incident type. The instructions may further include associating an image of a person causing the incident with the incident record. The instructions may further include broadcasting or otherwise communicating a portion or the entire incident record to one or more mobile communication devices within a pre-defined geographical area.

It will be appreciated that reference herein to "preferred" or "preferably" is intended as exemplary only.

The reference to any prior art in this specification is not, and should not be taken as an acknowledgement or any form of suggestion that the prior art forms part of the common general knowledge in Australia or in any other country.

The claims as filed and attached with this specification are hereby incorporated by reference into the text of the present description.

DETAILED DESCRIPTION OF THE DRAWINGS

Alternative embodiments of the disclosure will be apparent to those of ordinary skill in the art from consideration of the specification. It is intended that the specification and examples be considered as exemplary only, with a true scope and spirit of the disclosure being indicated by the claims which follow. It will be understood that the term "comprising" is intended to have a broad, open meaning and not limited to a particular embodiment.

Figure 1:
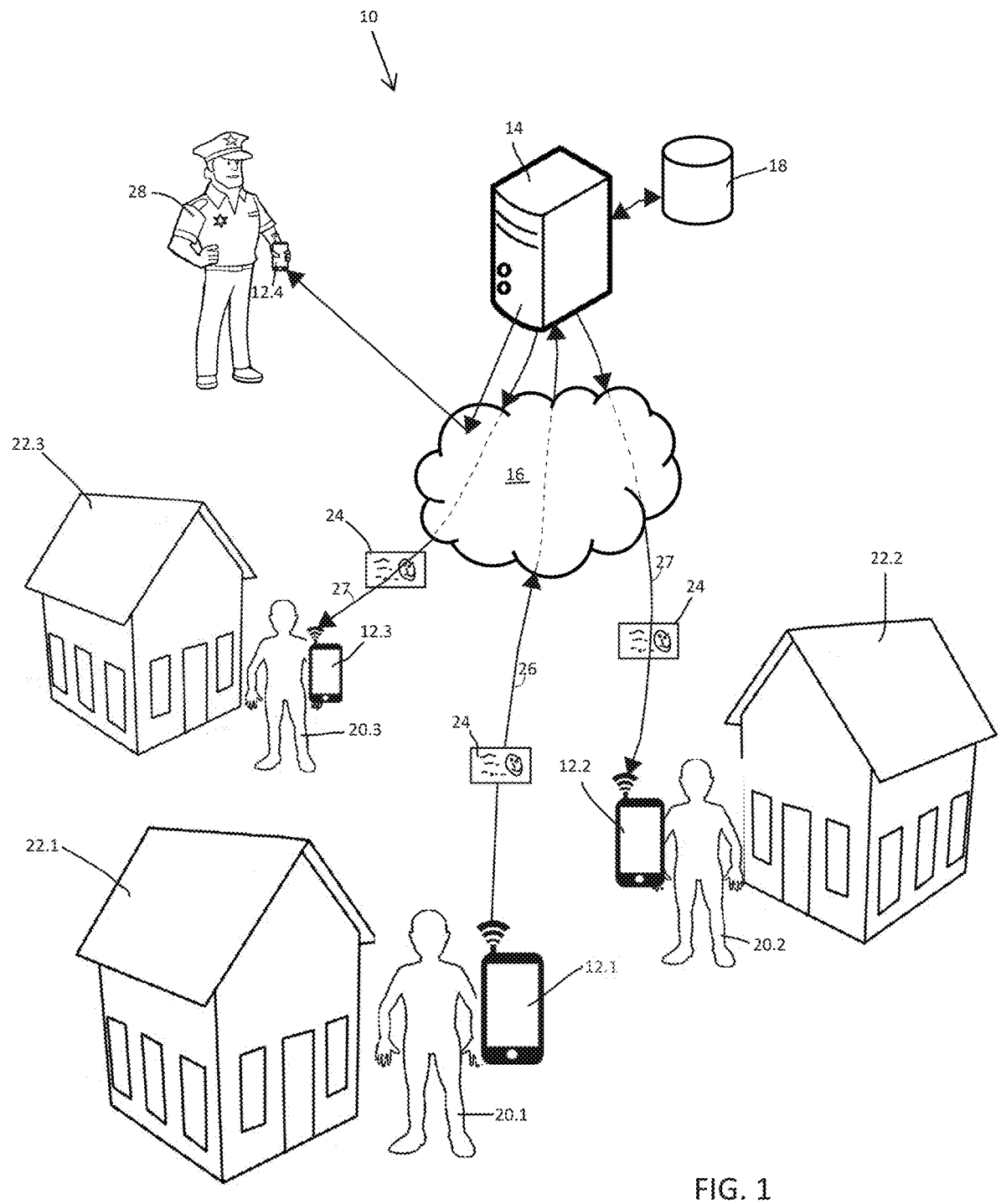
FIG. 1 is a diagram of the functional elements of a system for identifying and excluding a person in accordance with a preferred embodiment of the present disclosure.

Referring to FIG. 1, a system for restricting access to recreation venues, is generally indicated by reference numeral 10. System 10 is used to inform registered users of the system when an incident relevant to allowing access of a patron is reported by a nearby venue. The preferred elements of system 10 and their interrelationship are described below.

System 10 includes a number of mobile communications devices in the form of smartphones 12. Each smartphone 12 is associated with a security staff member 20 or a doorman at a different venue 22. System 10 includes a remote computer in the form of a central server 14 in communication with smartphones 12 over a communications network 16. Server 14 includes an offender library database 18.

System 10 includes an applications program, hereby termed the "Disorderly App", executed on smartphones 12. Reference to "staff" includes reference to security or a doorman at a venue.

The Disorderly App configures smartphone 12 to log specific behaviour of patrons as an incident record 24. Incident record 24 is broadcast or transmitted to smartphones 12 of other registered users of the system 10 who are within a predefined geographic area.

Each smartphone 12 is preferably a commercially available, conventional smartphone. Some of the basic features smartphone 12 preferably includes are: a touch sensitive graphical screen interface; a cellular radio transceiver; a Wi-Fi radio or chipset; a Global Navigation Satellite System (GNSS) radio or receiver in the form of a GPS chip or receiver and associated antenna; a digital camera; an internal clock; and the ability to run or execute an application, including the Disorderly App. In the examples that follow, specific coding for the Disorderly App has been omitted for simplicity as a person of ordinary skill in the art would be able to understand and reproduce the functionality of the described embodiments without the need for discussion on particular coding. Although a smartphone is described as an example of a mobile communications device, the mobile communications device may be a PDA, a laptop, a tablet, or any similar mobile device.

The location for download of the Disorderly App may depend on the operating system of smartphone 12. In one embodiment, smartphone 12 is an iPhone®, manufactured and sold by Apple, Inc. and runs the iOS operating system. For phones running the Android operating system the Disorderly App may be downloaded from the Google Play store and similarly for phones running the Windows operating system the Disorderly App may be downloaded from the Windows store.

The GNSS receiver uses the GPS, GLONASS, Galileo or Beidou system for providing a position of phone 12, but may use any other global navigation satellite system as needed. Most commercially available phones use the Global Positioning System (GPS) system to provide location information anywhere on or near the earth where there is an unobstructed line of sight to four or more GPS satellites. The GNSS receiver preferably forms part of an integrated chipset of phone 12. The GPS receiver may be augmented by using other sensors such as accelerometers, gyrocompasses, and even Wi-Fi positioning data to aid with location when the satellite visibility conditions are poor.

Communications network 16 includes a cellular or mobile broadband network and the internet to connect smartphone 12 to server 14. Communications network 16 allows incident records 24 logged by smartphone 12 to be uploaded to server 14. Smartphone 12 connects to communications network 16 via a cellular or mobile broadband connection or via a wireless access point such as Wi-Fi. Reference "Wi-Fi" is reference to a wireless local area network (WLAN) product based on the Institute of Electrical and Electronics Engineers' (IEEE) 802.11 standards.

Server 14 is a computer that can communicate over network 16. Server 14 would typically include one or more computer processors and one or more high-capacity storage devices such as hard drives, solid-state drives, flash disks and the like. The hardware of server 14 may be any of a number of off-the-shelf servers known to those skilled in the art of computing. Server 14 stores incident record information as discussed in more detail below. Server 14 includes administration software which manages access and queries to incident records 24 uploaded to server 14.

Server 14 may be managed or administrated by an administrator of the system. Server 14 may be a physical server or a cloud based server. Server 14 may thus be hosted by a third party in either a shared or dedicated hosting arrangement.

Server 14 optionally includes image recognition software which is executed on one of the server's processors to identify the person whose photo image appears in an incident record 24.

The Disorderly App is typically used in combination with one or more processors of smartphone 12, and where it is hosted, configures what might otherwise be a general purpose processor into a special purpose processor according to the functions and parameters of the Disorderly App. Preferably, the Disorderly App is downloaded to a computer readable medium such as a memory in smartphone 12.

Staff 20 download the Disorderly App to their smartphone 12. The Disorderly App is installed on smartphone 12 and may be launched in the conventional manner known for launching installed applications for the operating system of smartphone 12.

An incident record 24 logged by smartphone 12.1 at a first venue 22.1 is uploaded to server 14 as indicated by arrow 26. Incident record 24 is saved in offender library database 18. Incident record 24 is then broadcast by server 14 to registered smartphones 12.2 and 12.3 associated with venues 22.2 and 22.3, respectively, which are within a predetermined geographic area. Broadcasting of incident record 24 to venues 22.2 and 22.3 is indicated by arrows 27.

System 10 operates as a server push notification system wherein incident records 24 are delivered to smartphones 12 without specific request. System 10 does not require the Disorderly App to be open in order for an incident record 24 to be received. When incident record 24 is received, a notification on phone 12 alerts the staff member even when the phone's screen is locked.

Incident record 24 is optionally broadcast to a smartphone 12.4 of a police officer 28 in the predetermined geographic area.

Figure 2:
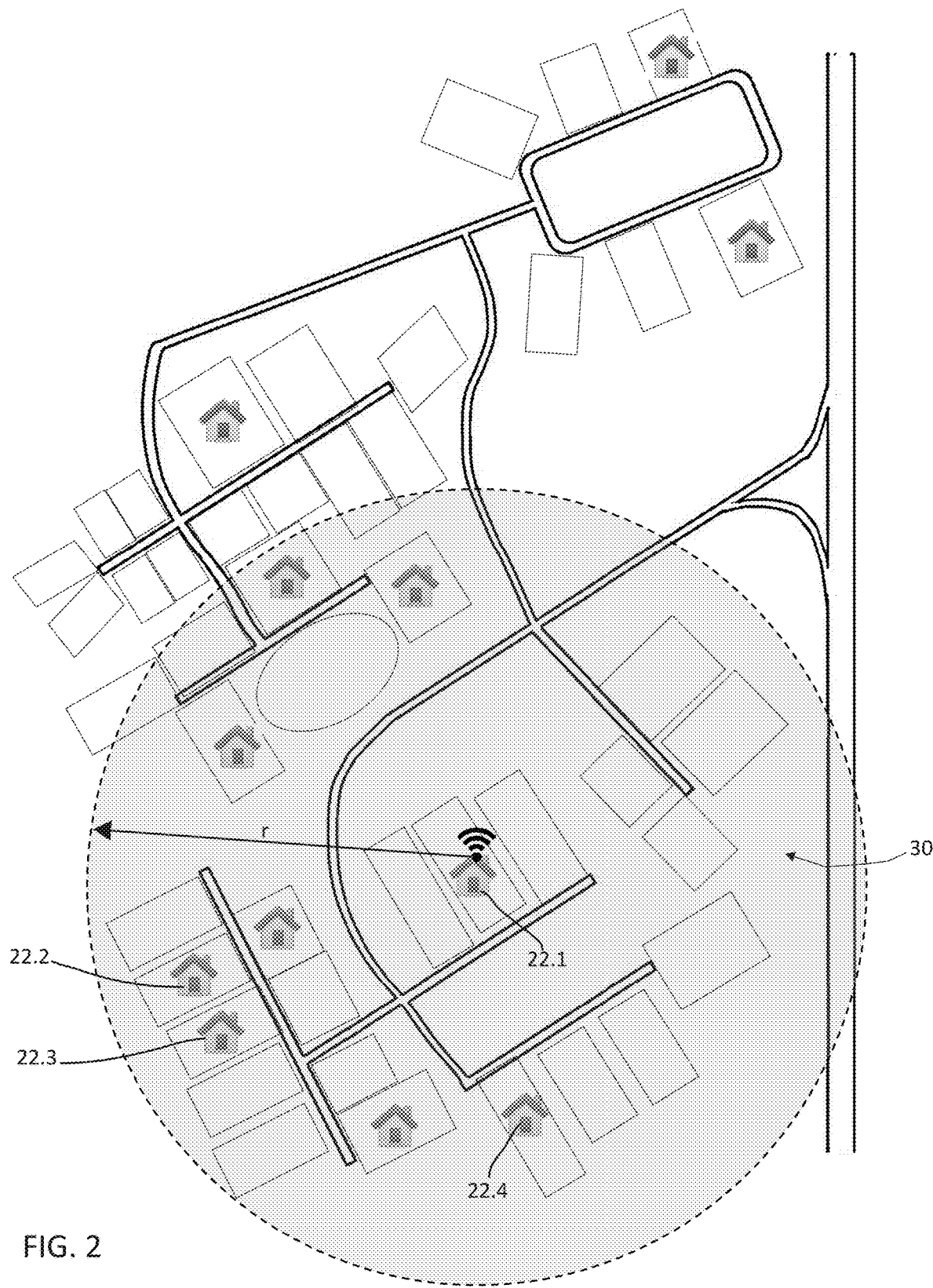
FIG. 2 is a map showing an incident record being broadcast to venues within a predetermined radius from a venue where the incident was logged.

The predetermined geographic area may be an area 30 within a set radius "r" of venue 22.1, as shown in FIG. 2. Venues outside of area 30 do not receive incident record 24. The location of the venue is set as the location of smartphone 12.1 associated with venue 22.1. Preferably, the location of the venue is configured as a static parameter so that it does not change as the smartphone is moved. If desired, the location of the incident may be based on the smartphone location rather than the venue location, or both the smartphone location and venue location.

Figure 3:
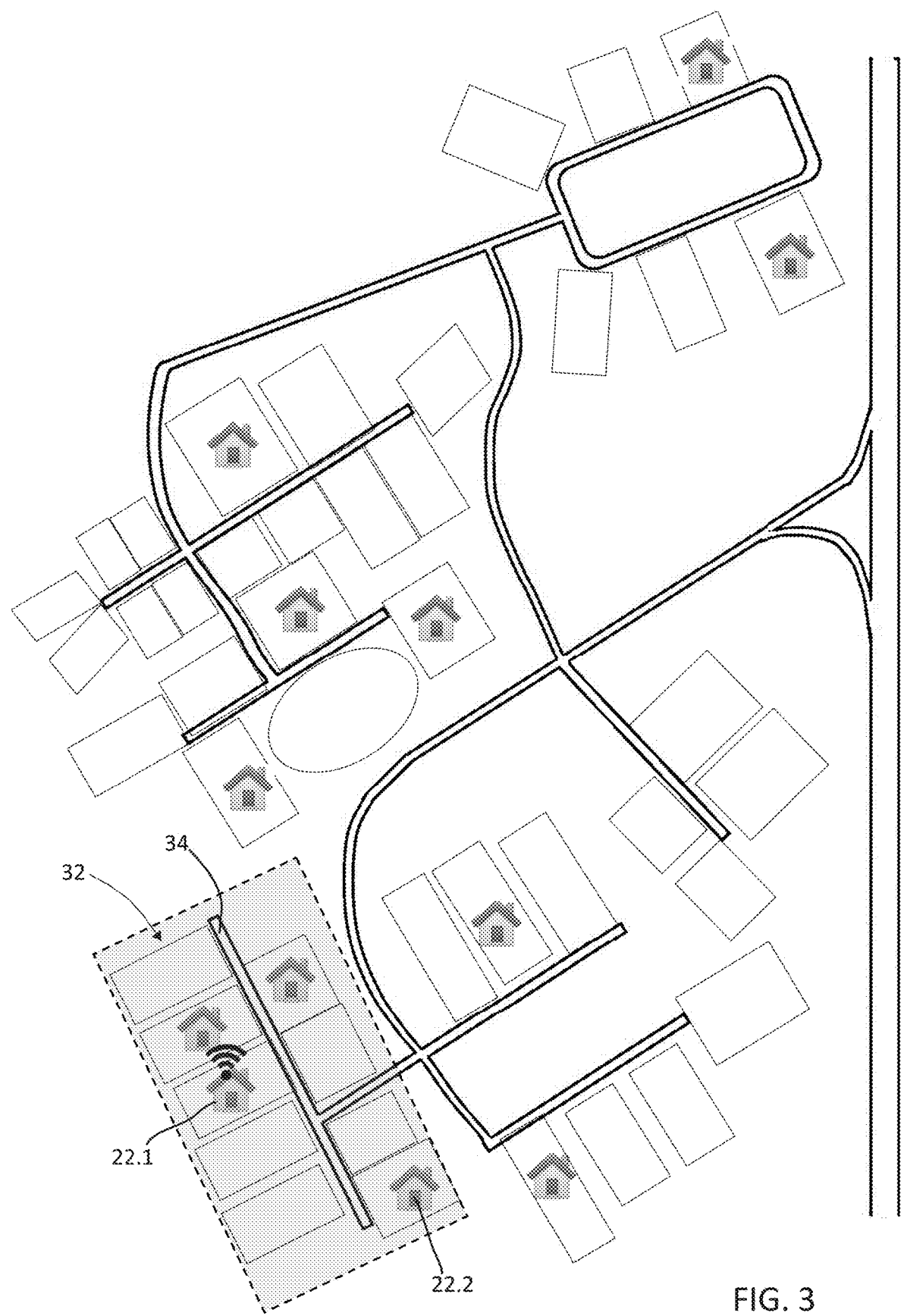
FIG. 3 is a map showing an incident record being broadcast to venues in the same street as the venue where the incident was logged.

FIG. 3 shows an embodiment where the predetermined geographic area is an area 32 of all venues 22 along a particular street 34.

Figure 4:
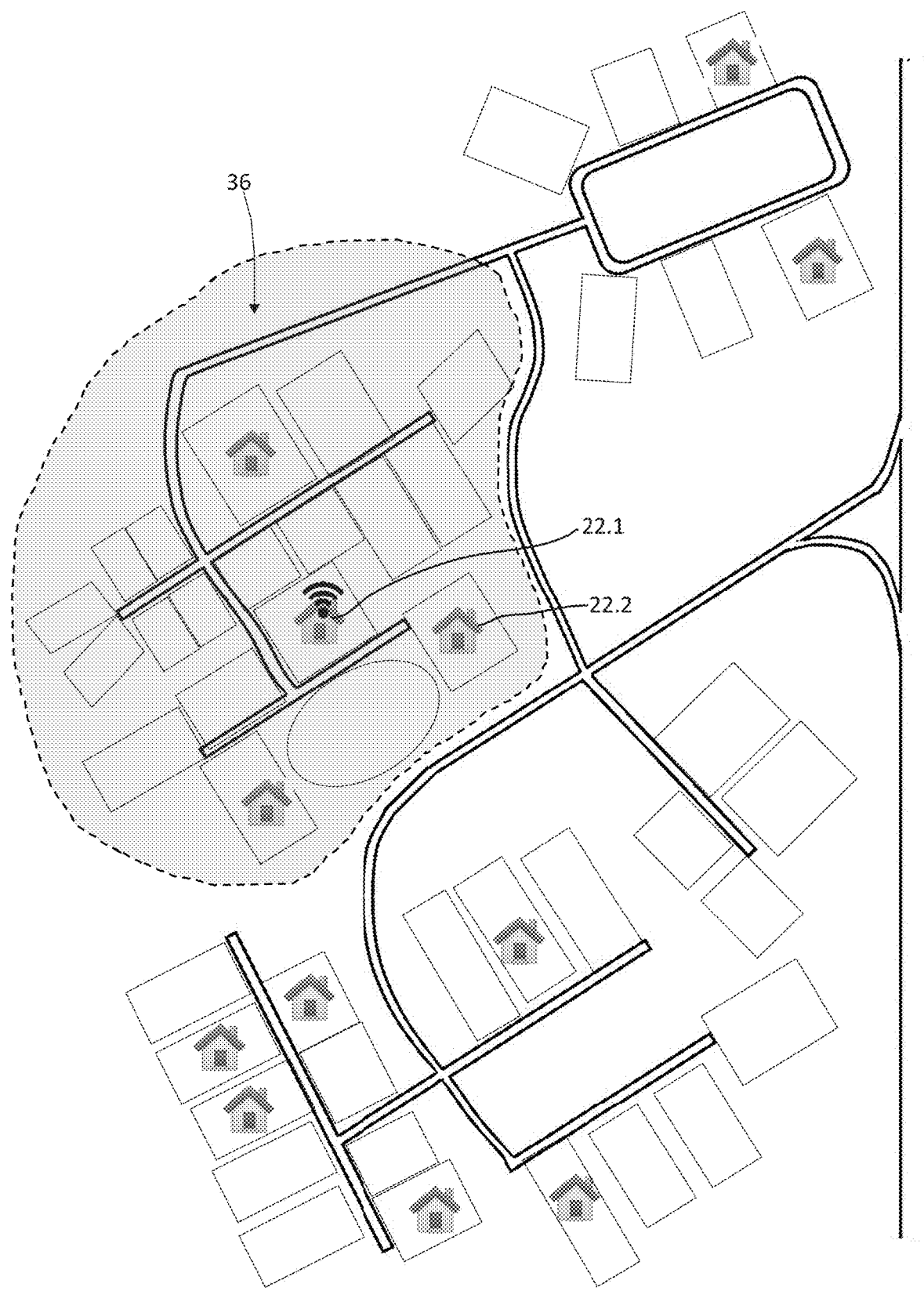
FIG. 4 is a map showing an incident record being broadcast to venues in the same precinct as the venue where the incident was logged.

FIG. 4 shows an embodiment of system 10 where the predetermined geographic area is a specified suburb or precinct 36.

Figure 5:
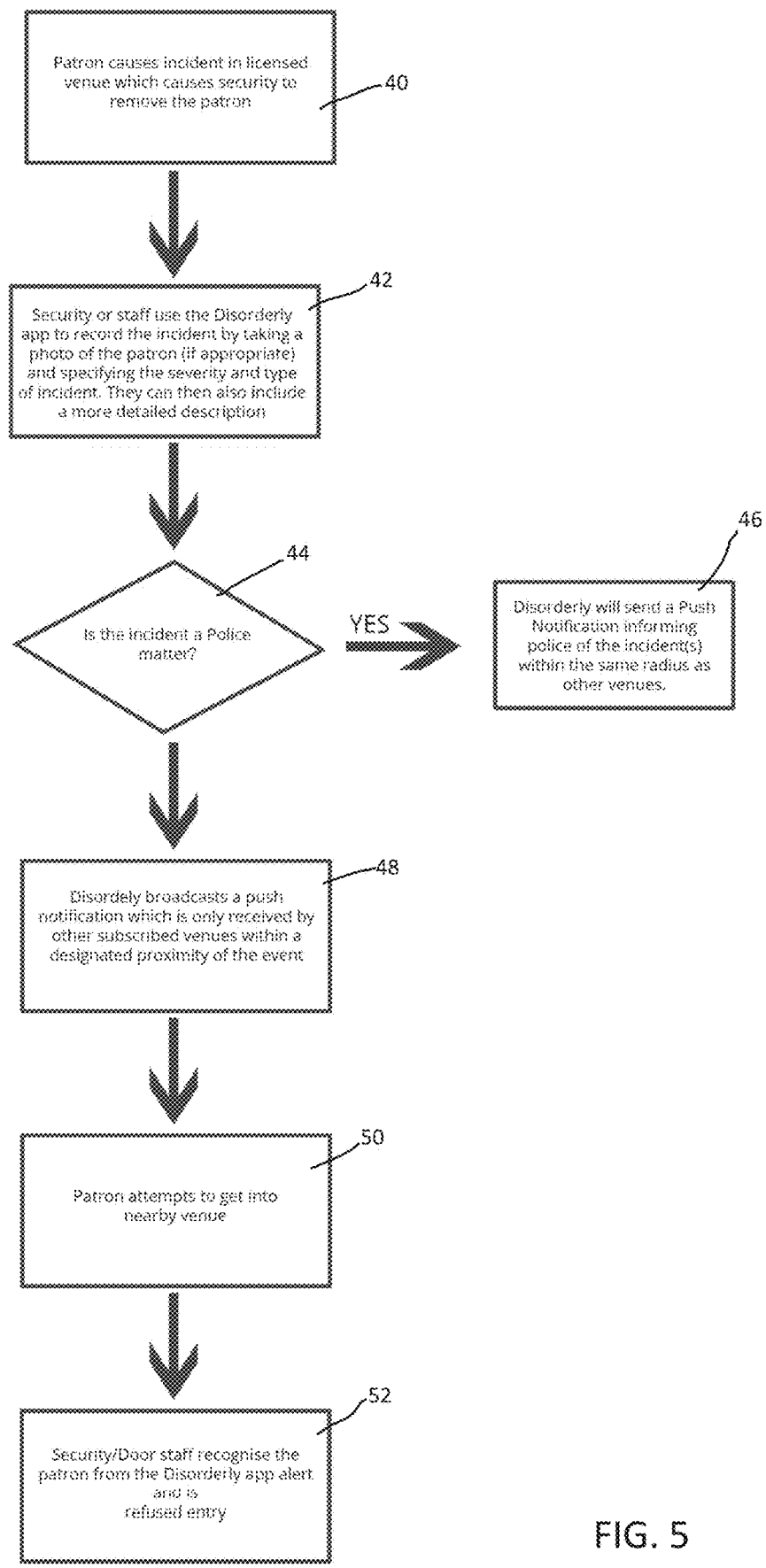
FIG. 5 is a flow diagram of steps to record and report an incident using the system of FIG. 1.

Referring to FIG. 5, a sequence of events which highlight the functionality of system 10 is shown. The sequence of events is described below with reference to the components of system 10 as described with reference to FIG. 1.

A patron who causes an incident at first venue 22.1 may be asked to leave or escorted out of the venue, as indicated at step 40. Security or staff 20.1 at first venue 22.1 record details of the incident on their smartphone 12.1, at step 42, to generate incident record 24.

The Disorderly App optionally requests confirmation 44 from staff 20.1 that the incident record must be sent to a police authority. If it is confirmed that the incident requires police involvement, the Disorderly App sends incident record 24 to police via a push notification as indicated at 46. The push notification may be sent to smartphones 12.4 of police officers 28 within the designated area who have the Disorderly App on their smartphones. In another embodiment the incident record may automatically be emailed or otherwise electronically sent to a police dispatcher.

Irrespective of incident record 24 being sent to the police or not, incident record 24 is broadcast 48 to venues 22.2 and 22.3 within designated area 30, 32, 36 of first venue 22.1 where the incident occurred.

The patron may then attempt at step 50 to enter one of the nearby venues 22.2, 22.3 which received incident record 24. Doormen at venues 22.2, 22.3 are likely to recognize the patron from incident record 24 and refuse entry at step 52.

The Disorderly App, when executed on smartphone 12, configures smartphone 12 to enable the features discussed below with reference to the screen shots shown in FIGS. 6 to 19.

Figure 6:
FIG. 6 is a login screen of an application executed on a smartphone of the system of FIG. 1.

Launching the Disorderly App configures smartphone 12 to display a login screen 60 shown in FIG. 6. Login screen 60 has fields 62, 64 for previously registered users to enter their username and password, respectively. The username is a unique identifier of staff 20 and may be an email address. First time users are prompted to register an appropriate username and password before being allowed to log in to the Disorderly App. The username and password details of previously registered users may be stored in a memory of their phone such that login happens automatically when the Disorderly App is opened.

Figure 7:
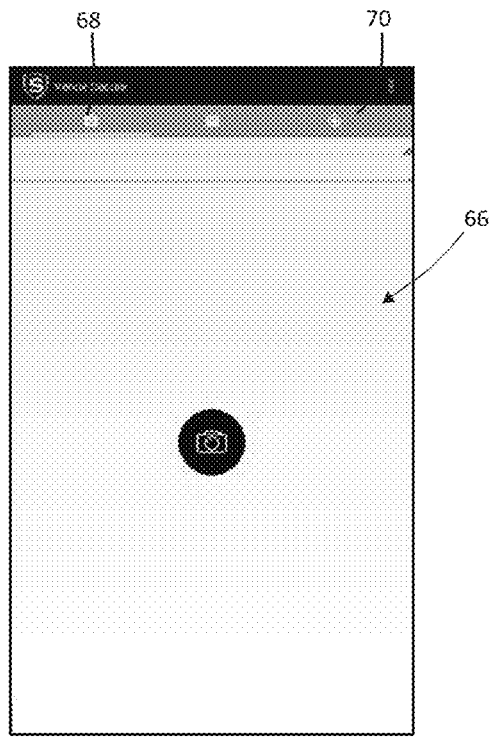
FIG. 7 is an incident capture screen of the application executed on the smartphone of the system of FIG. 1.
Figure 8:
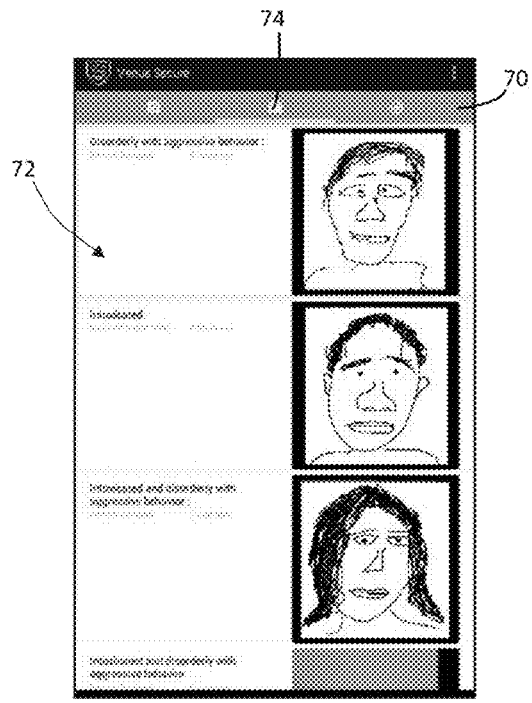
FIG. 8 is an incident list screen of the application executed on the smartphone of the system of FIG. 1.
Figure 9:
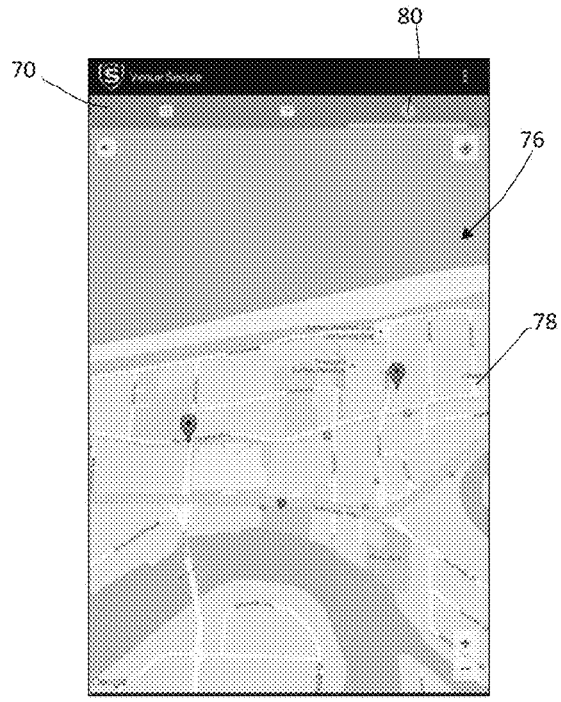
FIG. 9 is a venue map screen of the application executed on the smartphone of the system of FIG. 1.

After successful login the Disorderly App resolves to one of the landing screens shown in FIG. 7, 8, or 9.

FIG. 7 shows an incident capture screen 66 for capturing details of an incident. Capture screen 66 is activated by selecting an element 68 along a ribbon 70 at the top of the screen. Other elements of capture screen 66 are described in more detail with reference to FIG. 10.

FIG. 8 shows an incident list screen 72, which lists incident records received by the Disorderly App. Incident list screen 72 is activated by selecting an element 74 along ribbon 70. Details of incident list screen 72 are described in more detail with reference to FIG. 17.

FIG. 9 shows a venue map screen 76. Venue map screen 76 presents a map 78 to the user which shows the location of venues 22 within the field of the map 78. Venue map screen 76 is activated by selecting an element 80 along ribbon 70. Venue map screen 76 is described in more detail with reference to FIGS. 18 and 19.

Figure 10:
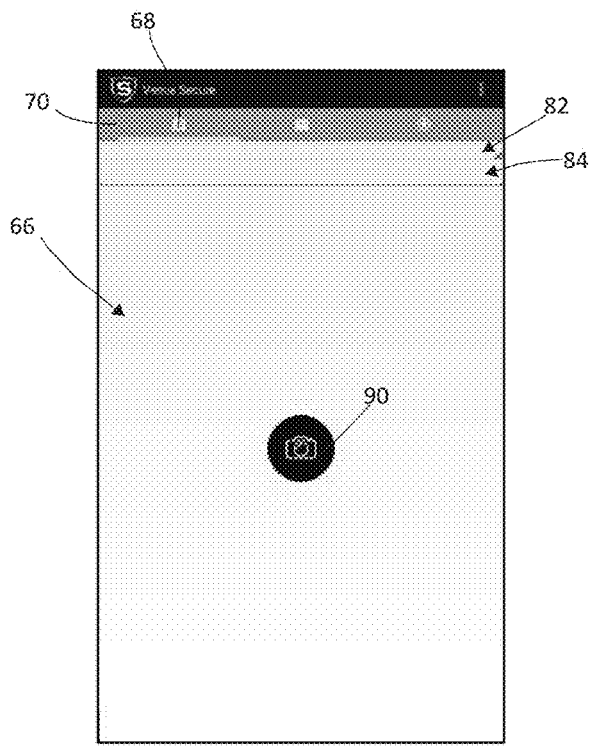
FIGS. 10 to 13 show the incident details screen of FIG. 7 populated with information to generate an incident report.

Incident capture screen 66, as depicted in FIG. 10, includes an incident category field 82, a details field 84 and a photo capture widget 90.

Figure 11:
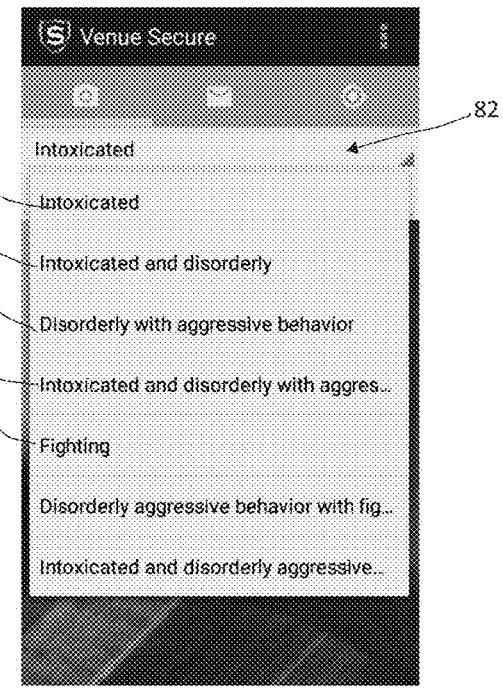

Staff 20 at venue 22.1 where an incident occurs open the Disorderly App to populate incident category field 82. Incident category field 82 is populated with a category of incident resulting in the patron being ejected from the venue. Incident category field 82 is a drop-down box with pre-defined categories from which the user selects a suitable category. It will be appreciated that the graphic user interface may use other ways for selecting an incident category, for example only, a radio box, navigation breadcrumbs, and/or hitting (clicking) buttons. FIG. 11 shows category field 82 in an expanded state wherein different predefined categories 86 are revealed for selection.

Figure 12:
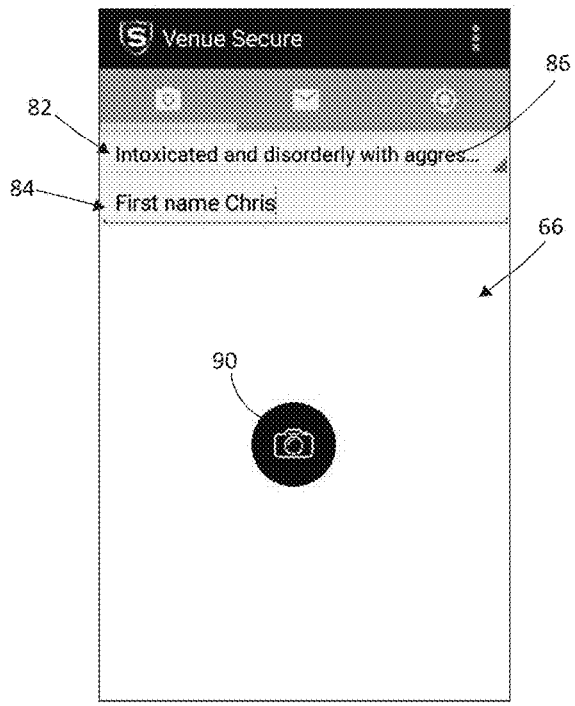

Predefined categories 86 include:
Intoxicated
Intoxicated and disorderly
Disorderly with aggressive behaviour
Intoxicated and disorderly with aggressive behavior
Fighting
Disorderly aggressive behavior with fighting FIG. 12 shows category field 82 populated with a selected category 86. Details field 84 is populated by the user typing details of the patron or incident into field 84.

Figure 13:
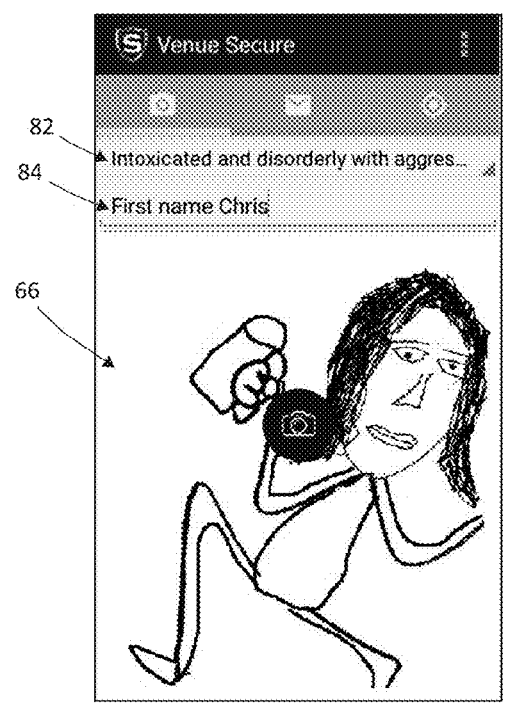

A photo of the patron is taken by activating capture widget 90. The photo image of the patron is displayed on screen 66 as depicted in FIG. 13. The action of taking the photo is also a trigger to upload incident record 24 to server 14.

In another embodiment, the photo of the patron is taken first, fields 82, 84 are then populated and a dedicated button is activated to trigger the upload of incident record 24 to server 14. More than one photo of the patron may be taken and incident record 24 may include multiple photos of the patron. Photos of the patron may also be taken by a camera application of the phone and then selected from a photo library via the Disorderly App to be included in incident record 24.

FIG. 13 shows screen 66 after fields 82, 84 have been populated and a photo has been taken of the patron to be reported.

Incident record 24 includes the name of venue 22.1 from which the incident record 24 is being sent, location details of venue 22.1, a time stamp of the time at which incident record 24 is sent, selected category 86, and any text from details field 84.

Figure 14:
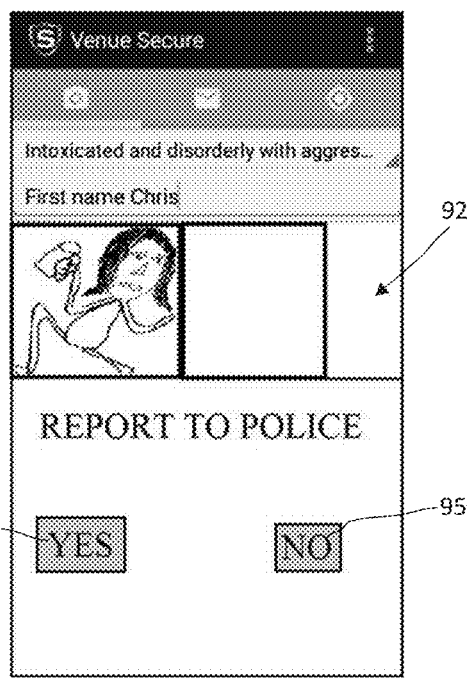
FIG. 14 shows a police reporting selection screen of the application executed on the smartphone of the system of FIG. 1.

The user has the option of forwarding incident record 24 to the police. FIG. 14 shows a prompt screen 92 which requests the user to confirm whether incident record 24 will be sent to the police. Screen 92 has a "yes" button 94 and a "no" button 95. Selecting "yes" button 94 confirms that incident record 24 should be sent to police. Selecting "no" button 95 confirms that incident record 24 is to be broadcast to venues 22 within the defined geographic area only.

Figure 15:
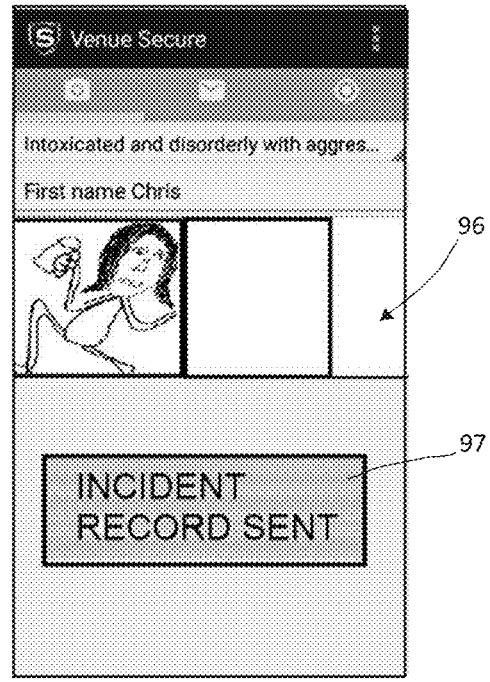
FIG. 15 shows a confirmation screen of the application executed on a smartphone of the system of FIG. 1, confirming that an incident record has been uploaded successfully.

The user receives confirmation from the Disorderly App that an incident record 24 has been sent to server 14 from smartphone 12.1. FIG. 15 shows a confirmation screen 96 with a confirmation element 97 which indicates that incident record 24 has been sent.

Figure 16:
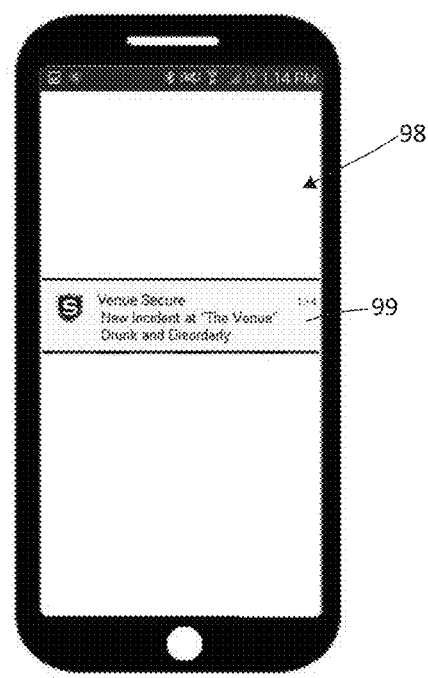
FIG. 16 shows a notification of a new incident record received by an application executed on a smartphone of the system of FIG. 1.

Other smartphones 12.2, 12.3 and 12.4 receive a notification, such as a push notification, from server 14 that a new incident report 24 has been received from a nearby venue. FIG. 16 shows a notification screen 98 with a pop-up notification 99 that a new incident report 24 has been received from a nearby venue. Selecting pop-up notification 99 opens the Disorderedly App to display an incident record list as described below.

Figure 17:
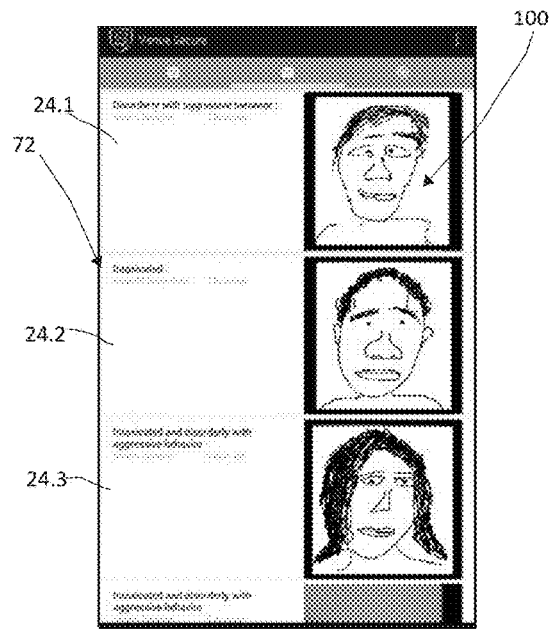
FIG. 17 shows the incident list screen of FIG. 8.

FIG. 17 shows a list or log 100 of incident records 24 received by the Disorderly App. Log 100 is sorted chronologically with the latest incident record 24.1 listed first, and earlier records 24.2 and 24.3 listed after.

Figure 18:
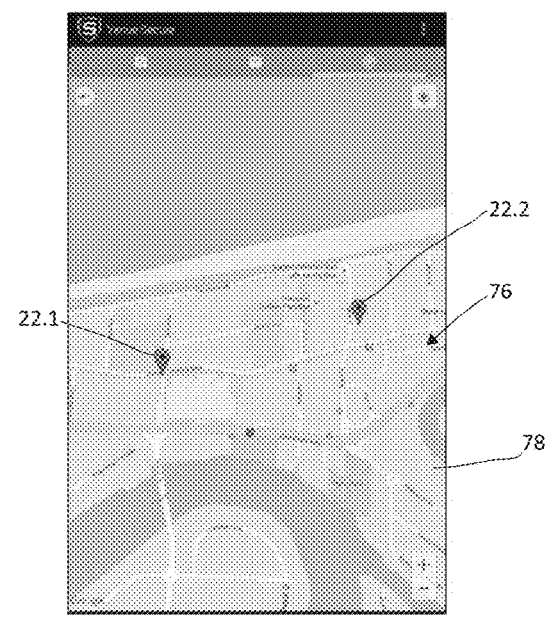
FIG. 18 shows the venue map screen of FIG. 9.
Figure 19:
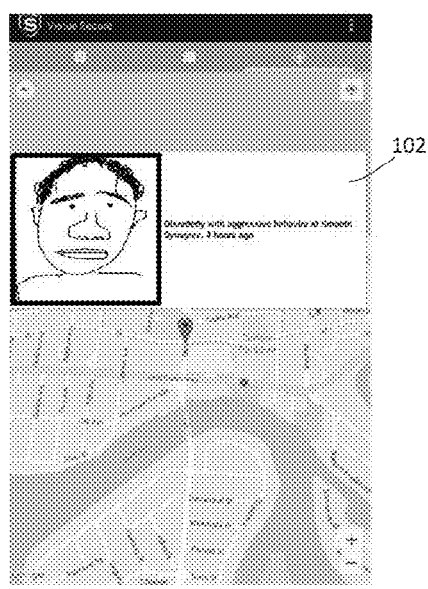
FIG. 19 shows the venue map screen of FIG. 18 with an incident hover box associated with one of the venues on the map.

FIG. 18 shows two venues 22.1 and 22.2 geotagged with markers on map 78 of venue map screen 76. Selecting a marker triggers the Disorderly App to display a hover box 102 shown in FIG. 19. Hover box 102 includes details of the latest incident record 24 for the venue associated with that marker.

The map system on the Disorderly App can direct police officers directly to venues where a recent incident has occurred. The photo image from the incident record can be used with the police's own technology, for example, face recognition technology, to instantly see if the patron is wanted for any other offences or has a history of criminal behaviour.

System 10 is an early warning system for security and management to see potential problem patrons who may be trying to enter their venue whom have caused trouble in nearby venues already. This will give them instant reason for refusal of entry and can prevent a more serious problem from accruing in their venue. This will make their venue safer for all other patrons within the venue.

The Applicant envisages that a venue will subscribe to a monthly subscription to system 10 to be able to make and receive push notifications of all disorderly patrons. Once a venue subscribes they will then need to sign up through the Disorderly App by providing their business name or company and liquor license number. Also their first name, last name, mobile number, and email address and set their own password. Once the venue is registered they will be set up to use the Disorderly App. Management of the venue will be able to add up to ten different phone numbers of employees and security guards to their account to have access to make and receive disorderly notifications.

Self-Exclusion

System 10 can also be used by patrons to exclude themselves from venues or specific areas in the venues. This may be the case where a patron has a gambling problem and voluntarily seeks to be excluded from the venue or a gambling area of the venue.

The patron will present himself to staff and ask to be excluded from the venue or from the gambling area in the venue.

The Disorderly App is configured to open an exclusion screen which is similar to incident capture screen 66. The exclusion screen has the required functionality to capture, via the phone, an image of the patron in the same manner as previously described for incident capture screen 66. The exclusion screen further includes fillable fields to be entered to document the self-exclusion. The fillable fields preferably mirror the fields of official government forms for self-exclusion. For example, in Queensland, Australia, a form 3A is required to be completed by staff or the patron to document a self-exclusion. The fields may include: the venue name; the areas of exclusion; personal details of the patron; and reasons for requesting exclusion.

An exclusion record is created which is then broadcast to other venues and a government authority in the same manner as incident record 24 is broadcast.

A log of exclusion records are kept, which is the same as log 100 of incident records 24. The log of exclusion records is held in a database of server 14, which is accessible by the venues and the government.

The predetermined area for broadcasting an exclusion record may be the whole of a state, county, province or country.

The patron can have his/her exclusion record removed from the log by applying to have it removed. In one embodiment the venue which added the exclusion record has the authority to have the exclusion record removed via the Disorderly App. The Disorderly App may have a separate screen for entering data when requesting that the exclusion record be removed.

The features described with respect to one embodiment may be applied to other embodiments, or combined with, or interchanged with, the features of other embodiments without departing from the scope of the present invention.

Other embodiments of the disclosure will be apparent to those skilled in the art from consideration of the specification and practice of the disclosure disclosed herein. It is intended that the specification and examples be considered as exemplary only, with a true scope and spirit of the disclosure being indicated by the following claims.

What is claimed is:

1. A security incident broadcast system for restricting recreation venue access of a person who caused an incident at a first recreation venue, the system comprising:
 a computer processor, of a mobile communications device, operationally coupled to a communications receiver to process incident records received by the receiver, the computer processor is configured to:
  identify a plurality of users, each user being associated with at least one recreation venue, each recreation venue being associated with at least one location and the mobile communications device;
  receive an incident record from the mobile communications device at the at least one recreation venue, the incident record including visual media of the person causing the incident, and an indication of incident type, the incident record excluding any name details of the person who caused the incident;

transmit, over a communications network, the incident record to one or more mobile communications devices associated with a grouping of recreation venues associated with the at least one user, the grouping of recreational venues being within a predetermined area of the incident; and determine a notification at the one or more mobile communication devices when the recreational venue that is within the predetermined area of the incident for notifying the associated user of the incident record;

said computer processor including image recognition technology to identify the person appearing in the visual media in the incident record by comparing the visual media to a database of visual media.

2. The system of claim 1, wherein the predetermined area is an area within a predetermined distance of at least one of the first recreation venue where the incident occurred and the GPS location of the mobile communication device associated with said person causing the incident.

3. The system of claim 1, wherein the image recognition technology includes facial recognition technology.

4. The system of claim 1, wherein said computer processor is configured to transmit at least a portion of the incident record to a law enforcement authority located within a predetermined distance of the first recreation venue where the incident occurred.

5. The system of claim 1, wherein the incident record received by said computer processor contains the location of the venue at which the incident took place.

6. The system of claim 1, wherein the predetermined distance is based on the GPS location of said mobile communications device.

7. The system of claim 1, wherein the predetermined distance is based on the physical address of the first recreation venue.

8. A method for enhancing security access to recreation venues by a person who caused an incident at a first recreation venue, the method comprising:

registering a plurality of venue staff members, each staff member being associated with one or more recreation venue, each recreation venue being associated with at least one location and at least one mobile communications device;

receiving, over a communications network, an incident record from a mobile communications device, incident record including visual media showing a person causing the incident, and an indication of incident type, the incident record not including the name of the person who caused the incident;

comparing the visual media to a database of visual media to recognize the person appearing in the visual media of the incident record;

transmitting, over the communications network, the incident record to at least one mobile communications device associated with at least one recreation venue staff member, the staff member being associated with a recreation venue within a predetermined area of the location of the incident; and determine a notification at the one or more mobile communication devices when the recreational venue that is within a predetermined area of the incident for notifying the staff member of the incident record.

9. The method of claim 8, wherein the predetermined area is an area within a predetermined distance of the first recreation venue where the incident occurred.

10. The method of claim 8, further comprising transmitting the incident record to a law enforcement authority.

11. The method of claim 10, further comprising requesting confirmation using the mobile communications device that the incident record is to be transmitted to the law enforcement authority.

12. The method of claim 8, wherein the step of transmitting the incident record comprises the step of transmitting the incident record to one or more selected from:

a mobile device located within a predetermined area of the incident, the mobile device being associated with a user; and a mobile device associated with a recreation venue located within the predetermined area, the recreation venue being associated with the user.

* * * * *